United States Patent [19]

Richey et al.

[11] 4,363,397
[45] Dec. 14, 1982

[54] Z-TRANSFER DEVICE FOR AMMUNITION

[75] Inventors: Earl D. Richey, Irvine; Franklin A. Dobson, Costa Mesa, both of Calif.

[73] Assignee: The United States of America as represented by the Secretary of the Army, Washington, D.C.

[21] Appl. No.: 238,721

[22] Filed: Feb. 27, 1981

[51] Int. Cl.³ ............................................ B65G 49/00
[52] U.S. Cl. ...................................... 198/655; 86/45; 198/707
[58] Field of Search .................... 86/45; 198/655, 707

[56] References Cited

U.S. PATENT DOCUMENTS 2,984,334  5/1961  Dungfelder et al. ............... 198/655
3,058,568  10/1962  Rudszinat ....................... 198/655 X
3,860,107  1/1975  Cioni et al. ..................... 198/655

FOREIGN PATENT DOCUMENTS 1309796  10/1962  France ............................ 86/45

Primary Examiner—Leland A. Sebastian
Attorney, Agent, or Firm—Nathan Edelberg; Robert P. Gibson; Max Yarmovsky

[57] ABSTRACT

A Z-transfer device transfers rounds of ammunition between laterally misaligned feeding and receiving apparatus by permitting the rounds to slide laterally with respect to each other while remaining parallel. Each round is retained in a bucket which is permitted to slide on a shaft with respect to adjacent buckets and each bucket is guided in a Z-shaped path between in-bearing and off-bearing apparatus.

4 Claims, 5 Drawing Figures

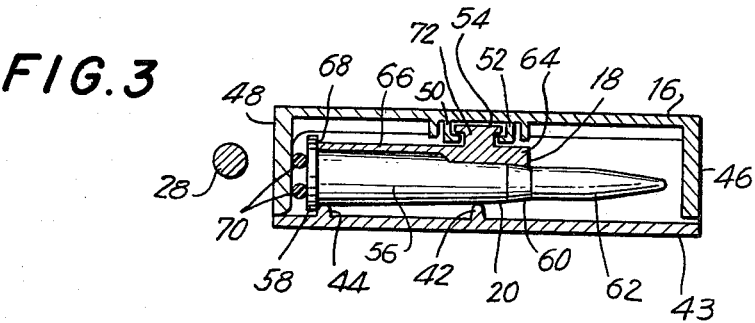
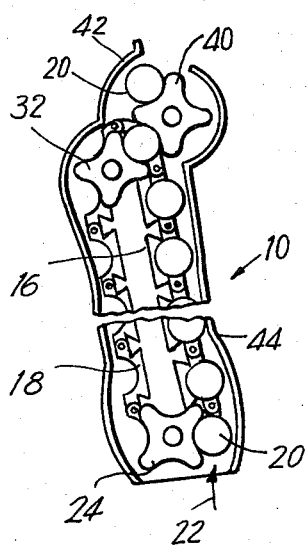
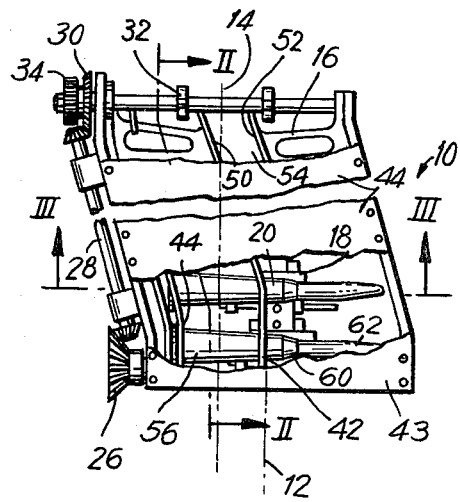

Z-TRANSFER DEVICE FOR AMMUNITION

GOVERNMENT INTEREST

The invention described herein was made in the course of a contract with the Government and may be manufactured, used and licensed by or for the Government for governmental purposes without the payment to us of any royalties thereon.

BACKGROUND OF THE INVENTION

The present invention relates to transfer devices and, more particularly, to ammunition transfer devices for conveying rounds of ammunition from one conveyor to another conveyor wherein the feeding and receiving conveyors are laterally displaced from each other.

Previous solutions have employed flexible conveyors which can be bent into rounded S-shaped curves or wide conveyors having ramps which push the rounds in the desired direction.

The above prior solutions have the disadvantage that a flexible conveyor which can be formed into an S-shaped curve consumes too much space for limited space environments. In addition, the use of wide conveyors with ramps to push the rounds in a desired direction, is undesirable not only for the additional space used, but also because the nose of the round may be contacted and deformed by the ramps.

Thus, certain storage areas were not usable since satisfactory transfer means was not available to interconnect laterally displaced conveyors.

OBJECTS AND SUMMARY OF THE INVENTION

Accordingly, it is an object of the present invention to provide a transfer device which overcomes the aforementioned drawbacks.

It is a further object of the invention to provide a transfer device adapted for transferring rounds between first and second laterally displaced locations wherein the rounds remain generally parallel to each other throughout the transfer operation.

According to an aspect of the invention, there is provided a transfer device for rounds of ammunition comprising a plurality of buckets each adapted for receiving one of the rounds of ammunition at a first location and for delivering it to a second location, the first and second locations being laterally offset from each other, means for linking the buckets in an endless chain, means for guiding the buckets from the first location to the second location, the means of linking being effective to permit adjacent buckets to be laterally displaced from each other and being further effective to maintain all of the buckets parallel to each other, and means for retaining the rounds in the buckets during transfer thereof.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 shows a side view of a transfer device according to an embodiment of the present invention partially cut away to reveal internal components;

FIG. 2 is a cross section taken along II—II of FIG. 1;

FIG. 3 is a cross section taken along III—III of FIG. 1;

DETAILED DESCRIPTION OF THE PREFERRED EMBODIMENTS

Figure 4:
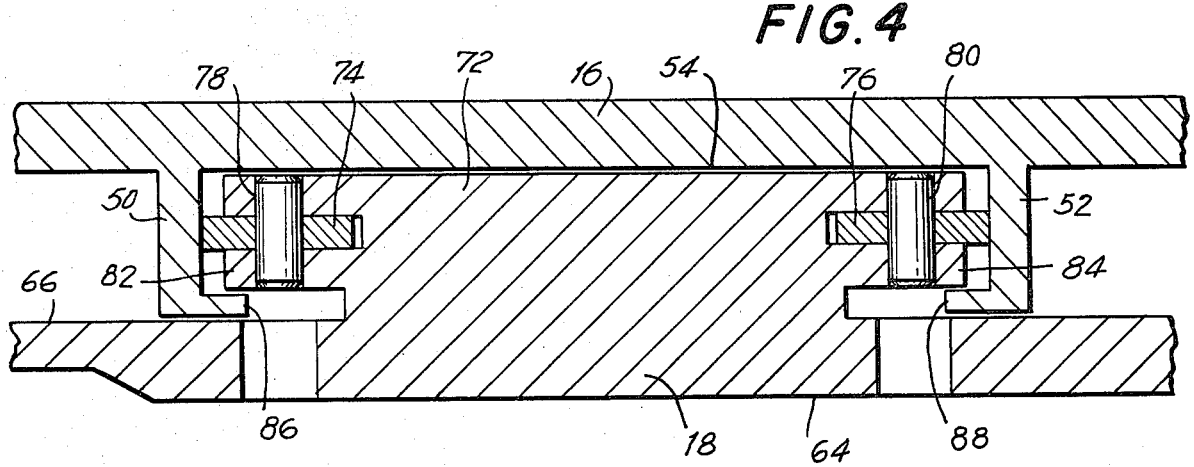
FIG. 4 is an enlarged cross sectional view of a guide track trolley and bucket of the apparatus of FIG. 3.

Referring now to FIG. 1, there is shown, generally at 10, a transfer device according to an embodiment of the present invention. Transfer device 10 is specially adapted for transporting rounds of ammunition from a first in-bearing device such as a conveyor (not shown) having a center line such as shown at 12 and delivering the rounds of ammunition to an off-bearing device (not shown) having a center line 14 which is substantially offset or laterally displaced from center line 12.

Referring now also to FIG. 2, a frame 16 supports and guides an endless chain of linked buckets 18 into which rounds 20 are delivered on a path such as, for example, the path shown by an arrow 22 in FIG. 2. Buckets 18 and rounds 20 are omitted in the upper portion of FIG. 1 to permit frame 16 to be seen. A pair of lower sprockets 24 (only one of which is seen in FIG. 2 and neither of which are seen in FIG. 1) are driven by a bevel gear 26 which is coupled via a transfer shaft 28 to an upper bevel gear 30 which, in turn, drives a pair of upper sprockets 32. Drive power for bevel gears 26 and 30 and transfer shaft 28 may be applied in any convenient manner such as, for example, through straight gear 34 from a power source (not shown).

At the upper end of transfer device 10, rounds 20 are removed by an off-bearing sprocket 40 guided by a curved guide bar 42 and may be deposited upon an off-bearing conveyor (not shown). Thus, filled buckets 18 travel up one side of frame 16, and empty buckets 18 return on the other side of frame 16 to receive a new cargo at lower sprocket 24.

A front cover 43, fragments of which are shown in FIG. 1, includes first and second guide bars 42 and 44 which bear against, and tend to hold round 20 in position in bucket 18.

Referring now to FIG. 3, frame 16 is seen to also include end plates 46 and 48 as well as a pair of facing L-shaped track members 50 and 52 in the center of frame 16 and which together define a guide track 54.

Round 20 includes a shell portion 56, usually of brass having a rim 58 at the rear thereof and a necked-down portion 60 at the front thereof which holds a slug 62.

Bucket 18 has a curved portion 64 which conforms to the curvature of the forward end of shell portion 56 and necked-down portion 60. Guide bar 42 on front cover 43 engages shell portion 56 opposed to curve portion 64 to maintain contact therebetween as round 20 is transported. An intermediate portion 66 of bucket 18 extends from curved portion 64 to a rim-abutment end 68 thereof. Intemediate portion 66 may be spaced slightly from shell portion 56. Guide bar 44 engages shell portion 56 opposed to the point at which abutment end 68 contacts shell portion 56. Rim-abutment end 68 tends to keep round 20 from moving to the right in FIG. 3.

Rim-guides bars 70 contact the end of shell portion 56 and tend to urge rim 58 into a firm contact with rim-abutment end 68.

A bucket support trolley 72 as seen in FIG. 4, supports and guides bucket 18 along guide track 54. Trolley wheels 74 and 76 are rotatably affixed by any convenient means such as, for example, by pins 78 and 80 respectively to extend slightly beyond the perimeter of bucket support trolley 72 to bear on the long arms of L-shaped track members 50 and 52.

Overhanging ears 82 and 84, holding trolley wheels 74 and 76 respectively, may optionally be disposed between short legs 86 and 88 respectively of L-shaped track members 50 and 52 and the surface of frame 16.

Returning now to FIG. 1, track members 50 and 52 are seen to follow a Z-shaped path. Thus, buckets 18 are urged to follow a similar Z-shaped path.

Figure 5:
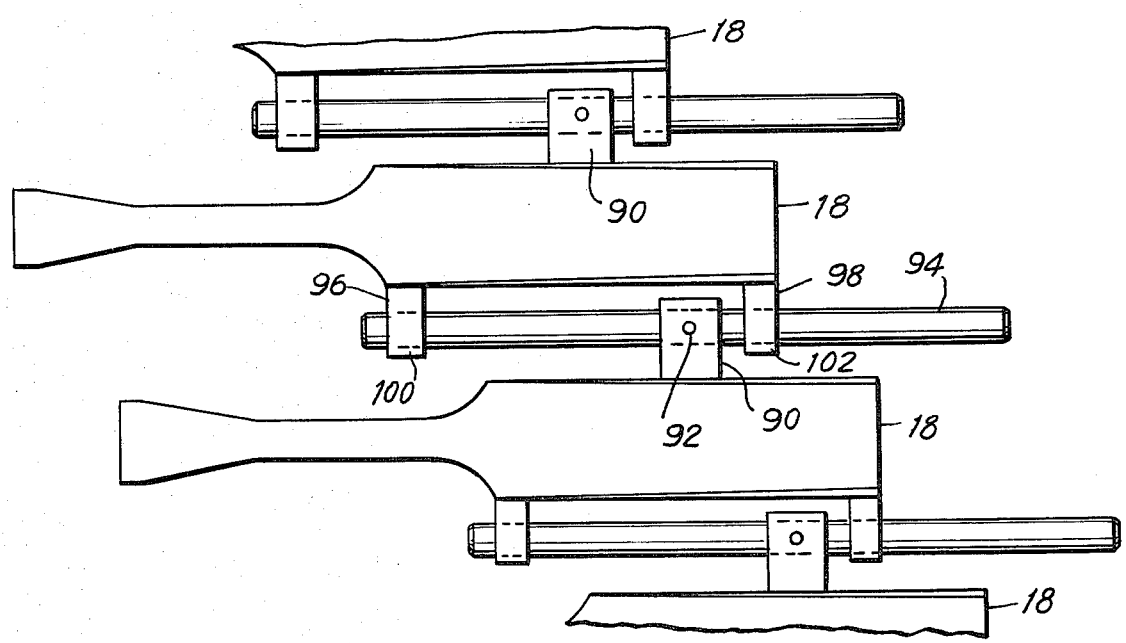
FIG. 5 is a partial view of a plurality of buckets laterally displaced from each other.

As previously noted, buckets 18 are linked together. Referring now to FIG. 5, it will be seen that each of buckets 18 includes a single lug 90 at one edge thereof which is rigidly affixed by any convenient means such as by a pin 92 to the center of slide shaft 94. The other side of each bucket 18 has a pair of lugs 96 and 98, each of which contains a bore 100 and 102 respectively loosely fitting slide shaft 94.

As will be clear from an examination of FIG. 5, each lug 90 is free to move between lugs 96 and 98 and to thus permit buckets 18 to be laterally displaced as necessary to follow the Z-shaped path while remaining parallel to each other.

Having described specific embodiments of the invention with respect to the accompanying drawings, it is to be understood that the invention is not limited to those precise embodiments, and that various changes and modifications may be affected therein by one skilled in the art without departing from the scope or spirit of the invention as defined in the appended claims.

We claim:

1. A transfer device for rounds of ammunition comprising:
    a plurality of buckets each adapted for receiving one of the rounds of ammunition at a first location and for delivering it to a second location, said first and second locations being laterally offset from each other;
    means for linking said buckets in an endless chain;
    means for guiding said buckets from said first location to said second location;
    said means for linking being effective to permit adjacent ones of said buckets to be laterally displaced from each other and being further effective to maintain all of said buckets parallel to each other; and
    means for retaining said rounds in said buckets during transfer thereof.

2. A transfer device according to claim 1 wherein said means for linking said buckets includes:
    at least a first lug at a first side of each bucket;
    at least a second pair of lugs at a second side of each bucket;
    a slide shaft affixed to each said first lug parallel to said bucket;
    a bore in each said at least a second lug slideably fitting over said slide shaft whereby adjacent buckets are permitted to laterally displace with respect to each other by said second lug sliding on said slide shaft while maintaining the adjacent buckets parallel to each other.

3. A transfer device according to claim 1 wherein said means for guiding includes:
    a frame extending at least a substantial portion of a distance between said first and second locations;
    first and second spaced-apart parallel track members on said frame defining a guide track therebetween;
    a trolley on each of said buckets disposed between said first and second track members;
    first and second trolley wheels rotatably disposed in laterally opposed positions on each of said trolley; and
    said first and second trolley wheels extending laterally beyond their respective trolley so as to guidingly bear laterally on said first and second track members.

4. A transfer device according to claim 1 wherein said round includes a shell portion having a rim and a slug and said means for retaining includes:
    an abutment end on said bucket adapted for abutting said rim adjacent said shell portion;
    at least one guide bar for contacting an end of said shell portion and for urging said rim toward abutment with said abutment end during a substantial portion of travel of said round; and
    at least a second guide bar for contacting said shell portion and for urging said shell portion into contact with said bucket.

* * * * *